United States Patent
Munige et al.

(10) Patent No.: US 10,520,670 B2
(45) Date of Patent: Dec. 31, 2019

(54) FEW MODE OPTICAL FIBER

(71) Applicant: Sterlite Technologies Limited, Aurangabad (IN)

(72) Inventors: Srinivas Reddy Munige, Aurangabad (IN); Anand Kumar Pandey, Aurangabad (IN)

(73) Assignee: STERLITE TECHNOLOGIES LIMITED, Aurangabad, MH (IN)

( * ) Notice: Subject to any disclaimer, the term of this patent is extended or adjusted under 35 U.S.C. 154(b) by 0 days.

(21) Appl. No.: 15/942,274

(22) Filed: Mar. 30, 2018

(65) Prior Publication Data

US 2019/0162897 A1 May 30, 2019

(30) Foreign Application Priority Data

Nov. 28, 2017 (IN) .............................. 201711042555

(51) Int. Cl.
  *G02B 6/028* (2006.01)
  *G02B 6/036* (2006.01)
  *G02B 6/02* (2006.01)
  *H04J 14/04* (2006.01)

(52) U.S. Cl.
  CPC ....... *G02B 6/0288* (2013.01); *G02B 6/02023* (2013.01); *G02B 6/0281* (2013.01); *G02B 6/02261* (2013.01); *G02B 6/03683* (2013.01); *G02B 6/03688* (2013.01); *G02B 6/02019* (2013.01); *H04J 14/04* (2013.01)

(58) Field of Classification Search
  None
  See application file for complete search history.

(56) References Cited

U.S. PATENT DOCUMENTS

| 7,773,846 | B2 * | 8/2010 | Bickham | ............ G02B 6/03688 385/125 |
| 8,995,803 | B2 * | 3/2015 | Bickham | ................ G02B 6/268 385/27 |
| 9,250,383 | B2 * | 2/2016 | Gruner-Nielsen | ... G02B 6/0288 |
| 9,638,856 | B2 * | 5/2017 | Sillard | ................ G02B 6/0288 |
| 9,709,731 | B2 * | 7/2017 | Gruner-Nielsen | ... G02B 6/0288 |
| 9,739,936 | B2 * | 8/2017 | Mo | .................... G02B 6/03666 |
| 2003/0108317 | A1 * | 6/2003 | Qi | ...................... G02B 6/02004 385/127 |
| 2012/0328255 | A1 * | 12/2012 | Bickham | .............. G02B 6/0288 385/124 |
| 2013/0071114 | A1 * | 3/2013 | Bickham | .............. G02B 6/0288 398/44 |
| 2016/0223743 | A1 * | 8/2016 | Sillard | ................ G02B 6/0288 |

* cited by examiner

*Primary Examiner* — Michelle R Connelly

(57) ABSTRACT

The present disclosure provides a few mode optical fiber. The few mode optical fiber includes a core region. A core region defined by a region around a central longitudinal axis of the few mode optical fiber. In addition, the core region has a first annular region extended from central longitudinal axis to radius $r_1$, a second annular region extended from radius $r_1$ to radius $r_2$, a third annular region extended from radius $r_2$ to radius $r_3$, a fourth annular region extended from radius $r_3$ to radius $r_4$ and a fifth annular region extended from radius $r_4$ to radius $r_5$. Also, the few mode optical fiber has a cladding defined by the sixth annular region extended from radius $r_5$ to radius $r_6$.

19 Claims, 4 Drawing Sheets

FEW MODE OPTICAL FIBER

TECHNICAL FIELD

The present disclosure relates to the field of optical fiber transmission. More particularly, the present disclosure relates to dispersion controlled few mode optical fiber with minimal spatial overlap between Lp01 and Lp11 guiding modes. The few mode optical fiber as described herein is suitable for space division multiplexing (SDM) applications. The present application is based on, and claims priority from an Indian Application Number 201711042555 filed on 28 Nov. 2017 the disclosure of which is hereby incorporated by reference herein.

BACKGROUND

The optical fibers have secured an important position in communication networks over the last few years. The present day coherent communication systems use the dense wavelength division multiplexing techniques to transfer the data. Several coherent modulation techniques such as OOK or QPSK with single mode fibers have been used to increase the data rate capacity of the communication system by taking almost all the freedoms available in modulation schemes. The telecommunication industry is continuously striving for the designs to meet the exponential increase in the data rate capacity demand. The ongoing research suggests that the few mode fiber which can allow the light to travel more than one mode with spatial division multiplexing scheme scan be a potential solution to increase the data rate by allowing the signal to transmit in more than one mode. Typically, the performance of these optical fibers is determined based on dispersion, intermodal crosstalk occurring due to spatial overlap between guiding modes and bending losses over a broad range of wavelength. In general, the dispersion, spatial overlap and bending losses are optimized based on a refractive index profile. The refractive index profile defines the properties of a core section and a cladding section. Also, the refractive index profile illustrates a relationship between the refractive index of the optical fiber with a radius of the optical fiber. Further, this profile is determined based on a concentration of dopants and materials used during manufacturing. Furthermore, the dispersion, spatial overlap between modes and bending losses are controlled by varying the thickness of each region of the optical fiber.

Currently available profiles of few mode fibers are not optimized for dispersion and spatial overlap between the Lp01 mode and Lp11 mode to use in broad band SDM applications in S, C and L bands. This results in intermodal crosstalk between the guiding modes.

In light of the above stated discussion, there is a dire need for a few mode optical fiber with dispersion control and minimized spatial overlap for low intermodal crosstalk between the modes while being suitable for SDM systems in long haul communications.

SUMMARY

In a first example, a few mode optical fiber is provided. The optical fiber includes a core region. A core region defined by a region around a central longitudinal axis of the few mode optical fiber. In addition, the core region has a first annular region. The first annular region is between the central longitudinal axis and a first radius r1 from the central longitudinal axis of the few mode optical fiber. Moreover, the core region has a second annular region. The second annular region is between the first radius r1 and a second radius r2 from the central longitudinal axis of the few mode optical fiber. Further, the core has a third annular region. The third annular region is between the second radius r2 to a third radius r3 from the central longitudinal axis of the few mode optical fiber. Furthermore, the core has a fourth annular region. The fourth annular region is between the third radius r3 and a fourth radius r4 from the central longitudinal axis of the few mode optical fiber. Furthermore, the core has a fifth annular region. The fifth annular region is between the fourth radius r4 and a fifth radius r5 from the central longitudinal axis of the few mode optical fiber. The first annular region, the second annular region, the third annular region, the fourth annular region and the fifth annular region are concentrically arranged. In addition, the few mode optical fiber includes a cladding. The cladding is a sixth annular region. The sixth annular region is between a fifth radius r5 and a sixth radius r6 from the central longitudinal axis of the few mode optical fiber. The sixth annular region has a sixth refractive index delta-6. In addition, the first annular region has a first refractive index delta-1. Moreover, the second annular region has a second refractive index delta-2. Further, the third annular region has a third refractive index delta-3. Furthermore, the fourth annular region has a fourth refractive index delta-4. Furthermore, the fifth annular region has a fifth refractive index delta-5. The first annular region, the second annular region, the third region, the fourth region, the fifth region and the sixth annular region are concentrically arranged about the central longitudinal axis. The fourth radius r4 is in the range of 8.3 microns to 9.9 microns. The fourth refractive index delta-4 is zero. The fifth radius r5 is in the range of 10.9 microns to 12.6 microns. The fifth refractive index delta-5 is in the range of 0.41 to 0.62. The sixth radius r6 is 62.5 microns. The sixth refractive index delta-6 is zero. The spatial overlap between the Lp01 mode and Lp11 mode is less than 10-5.

In a second example, a few mode optical fiber is provided. The optical fiber includes a core region. A core region defined by a region around a central longitudinal axis of the few mode optical fiber. The core region includes plurality of annular regions. The core has a fourth annular region. The fourth annular region is between the third radius r3 and a fourth radius r4 from the central longitudinal axis of the few mode optical fiber. Further, the core has a fifth annular region. The fifth annular region is between the fourth radius r4 and a fifth radius r5 from the central longitudinal axis of the few mode optical fiber. In addition, the few mode optical fiber includes a cladding. The cladding is a sixth annular region. The sixth annular region is between a fifth radius r5 and a sixth radius r6 from the central longitudinal axis of the few mode optical fiber. The sixth annular region has a sixth refractive index delta-6. The sixth annular region concentrically surrounds the fifth annular region. The fourth annular region has a fourth refractive index delta-4. Further, the fifth annular region has a fifth refractive index delta-5. The fourth radius r4 is in the range of 8.3 microns to 9.9 microns. The fourth refractive index delta-4 is zero. The fifth radius r5 is in the range of 10.9 microns to 12.6 microns. The fifth refractive index delta-5 is in the range of 0.41 to 0.62. The sixth radius r6 is 62.5 microns. The sixth refractive index delta-6 is zero. The fourth annular region, the fifth annular region and the sixth annular region are concentrically arranged about the central longitudinal axis. The few mode optical fiber has a spatial overlap between the Lp01 mode and Lp11 mode of less than 10-5.

In a third example, a few mode optical fiber is provided. The optical fiber includes a core region. A core region defined by a region around a central longitudinal axis of the few mode optical fiber. In addition, the core region has a first annular region. The first annular region is between the central longitudinal axis and a first radius r1 from the central longitudinal axis of the few mode optical fiber. Moreover, the core region has a second annular region. The second annular region is between the first radius r1 and a second radius r2 from the central longitudinal axis of the few mode optical fiber. Further, the core has a third annular region. The third annular region is between the second radius r2 to a third radius r3 from the central longitudinal axis of the few mode optical fiber. Furthermore, the core has a fourth annular region. The fourth annular region is between the third radius r3 and a fourth radius r4 from the central longitudinal axis of the few mode optical fiber. Furthermore, the core has a fifth annular region. The fifth annular region is between the fourth radius r4 and a fifth radius r5 from the central longitudinal axis of the few mode optical fiber. The first annular region, the second annular region, the third annular region, the fourth annular region and the fifth annular region are concentrically arranged. In addition, the few mode optical fiber includes a cladding. The cladding is a sixth annular region. The optical fiber has a sixth annular region. The sixth annular region is between a fifth radius r5 and a sixth radius r6 from the central longitudinal axis of the few mode optical fiber. The sixth annular region is the cladding region. The sixth annular region has a sixth refractive index delta-6. The sixth annular region concentrically surrounds the fifth annular region. In addition, the first annular region has a first refractive index delta-1. Moreover, the second annular region has a second refractive index delta-2. Further, the third annular region has a third refractive index delta-3. Furthermore, the fourth annular region has a fourth refractive index delta-4. Furthermore, the fifth annular region has a fifth refractive index delta-5. The first radius r1 is in the range of 3.8 microns to 4.2 microns. The first refractive index delta-1 is in the range of 0.42 to 0.70. The second radius r2 is in the range of 4.8 microns to 5.2 microns. The second refractive index delta-2 is zero. The third radius r3 is in the range of 8.2 microns to 8.7 microns. The third refractive index delta-3 is in the range of 0.4 to 0.58. The fourth radius r4 is in the range of 8.3 microns to 9.9 microns. The fourth refractive index delta-4 is zero. The fifth radius r5 is in the range of 10.9 microns to 12.6 microns. The fifth refractive index delta-5 is in the range of 0.41 to 0.62. The sixth radius r6 is 62.5 microns. The sixth refractive index delta-6 is zero. The spatial overlap between the Lp01 mode and Lp11 mode is less than 10-5. The first annular region is the central core region having an alpha profile. A peak shaping parameter alpha (c) is in a range of 2.7 to 10.

In an embodiment of the present disclosure, the first radius r1 is in a range of 3.8 microns to 4.2 microns and the first refractive index delta-1 is in a range of 0.42 to 0.70, the second radius r2 is in a range of 4.8 microns to 5.2 microns and the second refractive index delta-2 is approximately zero, the third radius r3 is in a range of 8.2 microns to 8.7 microns and the third refractive index delta-3 is in a range of 0.4 to 0.58, and the sixth radius r6 is 62.5 microns, and the sixth refractive index delta-6 is approximately zero.

In an embodiment of the present disclosure, the first annular region has an alpha profile, the alpha profile is defined by a peak shaping parameter alpha and the peak shaping parameter alpha is in a range of 2.7 to 10.

In an embodiment of the present disclosure, the few mode optical fiber has a mode field diameter in a range of 7.4 μm to 8.2 μm for Lp01 mode at a wavelength of 1550 nm, the few mode optical fiber has an effective area in a range of 43 μm2 to 55 μm2 for Lp01 mode at a wavelength of 1550 nm and wherein the few mode optical fiber has a effective area in a range of 368 μm2 to 570 μm2 for Lp11 mode at a wavelength of 1550 nm, the few mode optical fiber has a theoretical cutoff wavelength in a range of 2281 nm to 2810 nm for Lp11 mode and the few mode optical fiber has a theoretical cutoff wavelength in a range of 1950 nm to 2500 nm for Lp02 mode.

In an embodiment of the present disclosure, the few mode optical fiber has a differential group delay between Lp01 mode and Lp11 mode of less than 0.2 ps/km at a wavelength of 1550 nm.

In an embodiment of the present disclosure, the few mode optical fiber has a dispersion in a range of 4 Ps/nm/km to 16 Ps/nm/km for Lp01 mode at a wavelength of 1460 nm, the few mode optical fiber has a dispersion in a range of −0.3 ps/nm/km to 6 Ps/nm/km for Lp111 mode at a wavelength of 1460 nm, the few mode optical fiber has a dispersion in a range of 4.1 Ps/nm/km to 21 Ps/nm/km for Lp01 mode at a wavelength of 1530 nm, the few mode optical fiber has a dispersion in a range of 4.5 Ps/nm/km to 11 Ps/nm/km for Lp11 mode at a wavelength of 1530 nm, the few mode optical fiber has a dispersion in a range of 4 Ps/nm/km to 22 Ps/nm/km for Lp01 mode at a wavelength of 1550 nm, the few mode optical fiber has a dispersion in a range of 5.8 Ps/nm/km to 12 Ps/nm/km for Lp11 mode at a wavelength of 1550 nm, the few mode optical fiber has a dispersion in a range of 4.5 Ps/nm/km to 23 Ps/nm/km for Lp01 mode at a wavelength of 1565 nm, the few mode optical fiber has a dispersion in a range of 6.8 Ps/nm/km to 13 Ps/nm/km for Lp11 mode at a wavelength of 1565 nm, the few mode optical fiber has a dispersion in a range of 3.9 Ps/nm/km to 26 Ps/nm/km for Lp01 mode at a wavelength of 1625 nm and the few mode optical fiber has a dispersion in a range of 10 Ps/nm/km to 17 Ps/nm/km for Lp11 mode at a wavelength of 1625 nm.

In an embodiment of the present disclosure, the few mode optical fiber has a macrobending loss of less than 2.1 dB/turn for 16 mm bending radius at a wavelength of 1625 nm for Lp11 mode.

In an embodiment of the present disclosure, the few mode optical fiber includes a plurality of annular regions including a first annular region, a second annular region and a third annular region.

BRIEF DESCRIPTION OF FIGURES

Figure 1A:
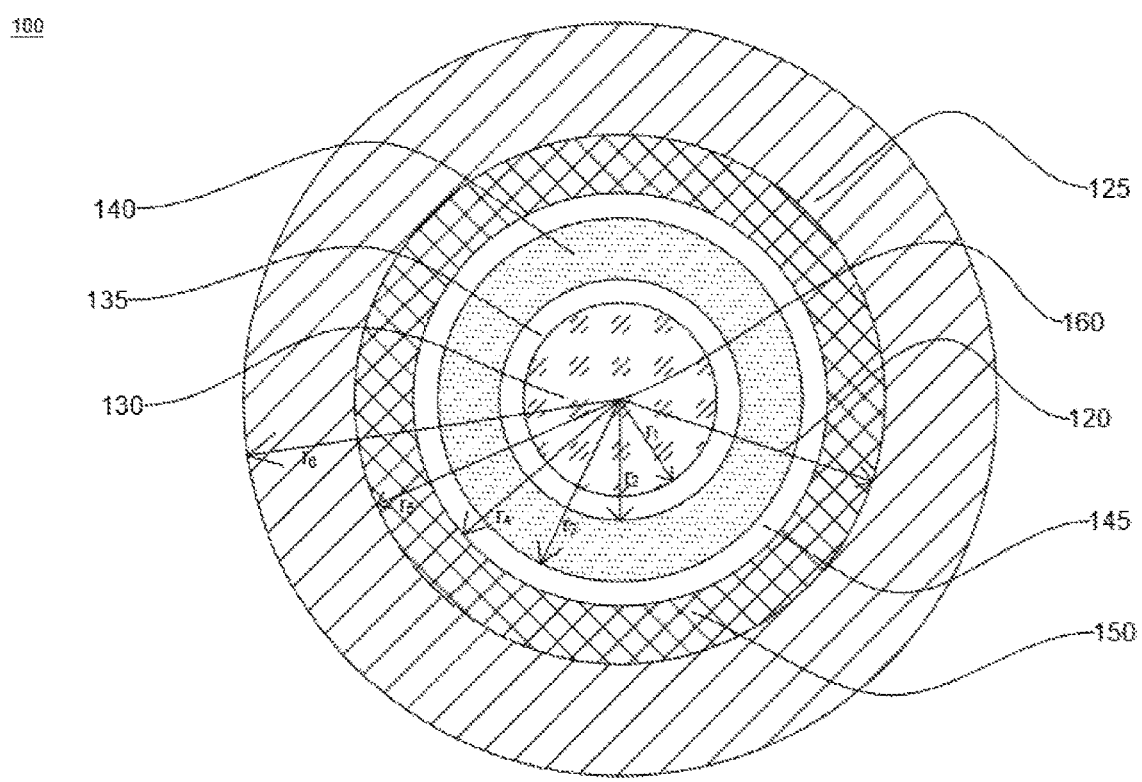
Figure 1B:
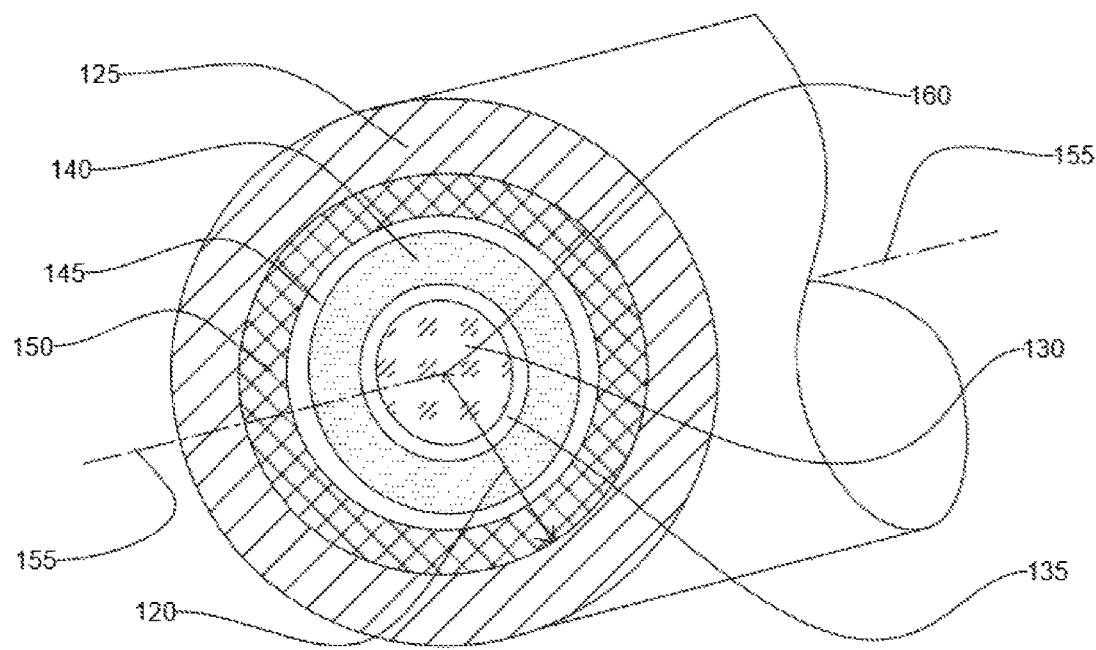
Figure 2:
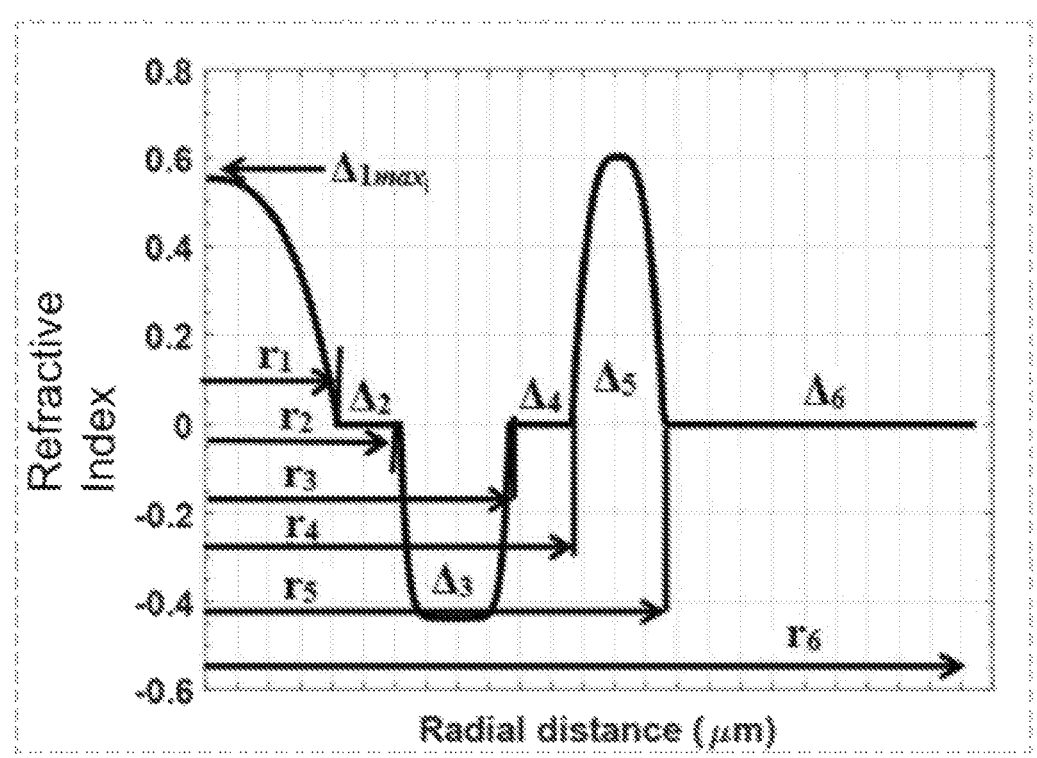
Figure 3:
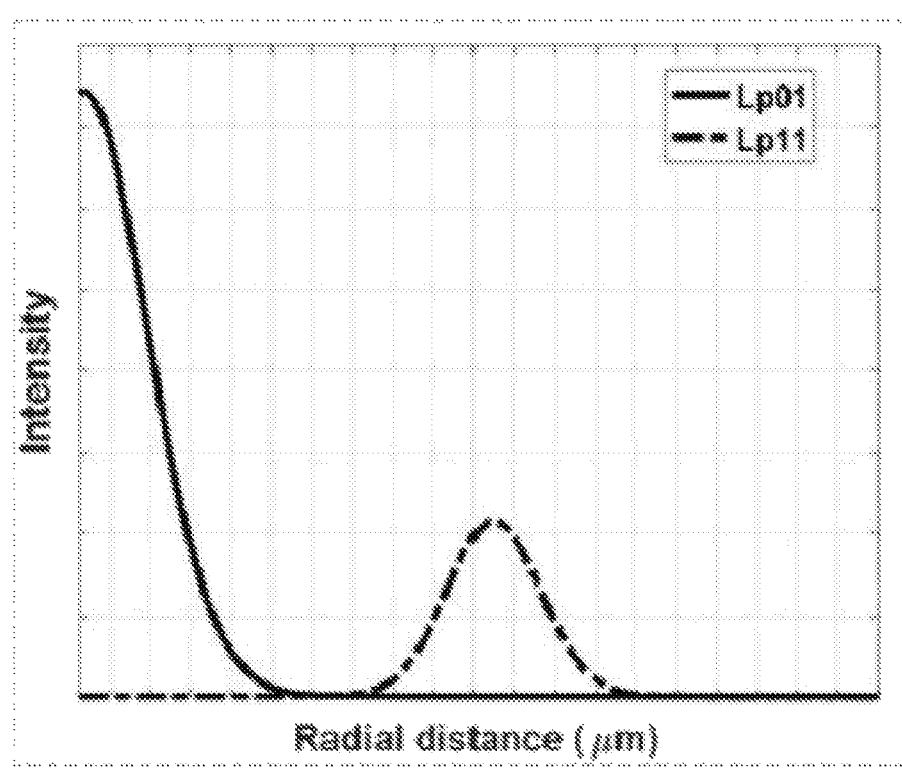

Having thus described the disclosure in general terms, reference will now be made to the accompanying figures, wherein:

FIG. 1A illustrates a cross-sectional view of a few mode optical fiber, in accordance with various embodiments of the present disclosure;

FIG. 1B illustrates a perspective view of a few mode optical fiber, in accordance with various embodiments of the present disclosure;

FIG. 2 illustrates a refractive index profile of the few mode optical fiber, in accordance with various embodiments of the present disclosure; and FIG. 3 illustrates a normalized intensity-radial distance profile for Lp01 mode and Lp11 mode, in accordance with an embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifications for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1A illustrates a cross-sectional view of a few mode optical fiber 100, in accordance with various embodiments of the present disclosure. The few mode optical fiber 100 is a fiber used for transmitting information as light pulses from one end to another. In addition, the few mode optical fiber 100 is a thin strand of glass or plastic capable of transmitting optical signals. The few mode optical fiber 100 is configured to transmit large amount of information over long distances with relatively low attenuation. Moreover, the few mode optical fiber 100 can be utilized for Space Division Multiplexing Applications. Further, the few mode optical fiber 100 is operated in different modes including Lp01 mode and Lp11 mode. In another embodiment of the present disclosure, the few mode optical fiber 100 can be operated in six modes including two degenerate Lp01 modes and four degenerate Lp11 modes. In yet another embodiment of the present disclosure the few mode optical fiber is operated in broad range of wavelength between 1460 nm to 1625 nm for both Lp011 mode and Lp11 mode.

In yet another embodiment of the present disclosure, the few mode optical fiber is operated in broad range of wavelength in S,C and L bands. A few mode optical fiber is that in which fibers support only few guided modes. A two-mode optical fiber (with LP01 and LP11) exhibits 6 different modes considering the degeneracy's.

In an embodiment of the present disclosure, the few mode optical fiber 100 may be utilized for other applications. Going further, the few mode optical fiber 100 is dispersion optimized few mode optical fiber. The few mode optical fiber 100 allows the light to travel in more than one mode. The few mode dispersion optimized optical fiber is used for Spacedivision multiplexing applications. In addition, the few mode optical fiber 100 has increased data rate by allowing the light to travel in more than one mode.

In an embodiment of the present disclosure, the type of the dispersion which occurs inside the few mode optical fiber is chromatic dispersion. The chromatic dispersion is the spreading of the optical signals which results from different speeds of light rays travelling inside the optical fiber 100. Moreover, the chromatic dispersion occurs due to material dispersion and waveguide dispersion.

The material dispersion occurs due to a change in a refractive index of the optical fiber 100 with an optical frequency. Moreover, the waveguide dispersion occurs due to dependency of mode propagation on wavelength. In an embodiment of the present disclosure, the few mode optical fiber 100 has a pre-determined value of dispersion (provided below in the detailed description).

In an embodiment of the present disclosure, the dispersion optimized few mode optical fiber 100 enables controlled dispersion over a range of wavelength. In another embodiment of the present disclosure, the few mode optical fiber 100 exhibits low dispersion in Lp01 mode and Lp1111 mode for wavelength range of 1460 nm-1625 nm. In addition, the dispersion optimized few mode fiber 100 enables minimization of spatial overlap between the Lp011 mode and Lp11 mode. In yet another embodiment of the present disclosure, the few mode optical fiber enables near zero spatialoverlap between Lp01 mode and Lp11 mode throughout the range of wavelength. Further, the dispersion optimized few mode optical fiber 100 enables the dispersion optimization throughout the range of wavelength. The range of wavelength corresponds to a range in which the few mode optical fiber 100 is configured to operate. The range of wavelength for the present disclosure is 1460 nm-1625 nm. In yet another embodiment of the present disclosure, the few mode optical fiber 100 is used for spacedivision multiplexing to increase the data capacity. In space division multiplexing the optical signals is transmitted in different guiding modes of the optical fiber 100. Accordingly, the optical signals are separated at another end.

In an embodiment of the present disclosure, the dispersion optimized few mode optical fiber 100 is used for communication purpose. In another embodiment of the present disclosure, the dispersion optimized few mode optical fiber 100 is operated in S, C and L bands.

In an embodiment of the present disclosure, the mode field diameter defines a section or area of the few mode optical fiber 100 in which the optical signals travel. The theoretical cut-off wavelength is defined as the wavelength above which the given mode cannot propagate. In an embodiment of the present disclosure, each of the plurality of attributes has a specific value or a range of value. In an embodiment of the present disclosure, the few mode optical fiber 100 has a mode field diameter in the range of 7.4 μm to 8.4 μm for Lp01 mode at a wavelength of 1550 nm. The mode field diameter (MFD) is an expression of distribution of the optical power. It is measured using Peterman II method where $MFD = \sqrt{2}\left[\dfrac{\int E^2(r)dr}{\int [dE(r)/dr]^2 rdr}\right]^{1/2}$ The integral limits being 0 to infinity. In another embodiment of the present disclosure, mode field diameter plays an important role in estimating macro bending losses.

In an embodiment of the present disclosure, the few mode optical fiber 100 exhibits bending losses. The bend losses correspond to the losses that the optical fiber exhibits when they are bent. The bending loss includes macro bending losses and micro bending losses. In an embodiment of the present disclosure, the few mode optical fiber 100 exhibits macrobending loss less than 2.1 dB/turn for 16 mm bending radius at a wavelength of 1625 nm for Lp11 mode.

In an embodiment of the present disclosure, the few mode optical fiber cable 100 has an effective area. Effective area determines how much energy the core can carry without causing non-linear type signal losses. The effective area of the fundamental mode is a measure of the area over which the energy in the electric field is distributed. In an embodiment of the present disclosure, the few mode optical fiber 100 has an effective area in the range of 40 µm2 to 60 µm2 for Lp01 mode at a wavelength of 1550 nm. In another embodiment of the present disclosure, the few mode optical fiber 100 has an effective area in the range of 360 µm2 to 570 µm2 for Lp11 mode at a wavelength of 1550 nm. The effective area is measured by using the expression:

Effective area $A_{eff} = \dfrac{\left[\int\int |E(r)|^2 rdr\right]^2}{\int\int |E(r)|^4 rdr}$ wherein, 'r': radial distance from the centre.

In an embodiment of the present disclosure the few mode optical fiber 100 has a differential group delay between Lp01 mode and Lp11 mode. The differential group delay is the difference in propagation time between the two eigen modes. In an embodiment of the present disclosure, the differential group delay between Lp01 mode and Lp11 mode is less than 0.2 ps/km at a wavelength of 1550 nm.

In an embodiment of the present disclosure, there is spatial overlap between the Lp01 mode and Lp11 mode. The spatial overlap is defined as: Spatial Overlap $-\int I_{01} I_{11} rdr$ wherein, integral limits=$-\infty$ to $+\infty$
'r': radial position from center;
'I01': Normalised intensity profiles of Lp01 mode;
'I11': Normalised intensity profile of Lp11 mode.

In an embodiment of the present disclosure, the spatial overlap between the Lp01 mode and Lp11 mode is less than 10-5.

In an embodiment of the present disclosure, the few mode optical fiber 100 has a theoretical cut-off wavelength. The theoretical cut-off wavelength refers to the wavelength above which the given mode cannot propagate. In an embodiment of the present disclosure, the theoretical cut-off wavelength for Lp11 mode is in the range of 2280 nm to 2810 nm. In another embodiment of the present disclosure, the theoretical cut-off wavelength for Lp02 mode less than 2500 nm.

Going further, the few mode optical fiber 100 includes a core region 120 and a cladding region. The core region 120 is an inner part of the few mode optical fiber 100 and the cladding section is an outer part of the few mode optical fiber 100. Moreover, the core region 120 is defined by a region around a central longitudinal axis 155 of the few mode optical fiber 100 (As shown in the perspective view of the few mode optical fiber in FIG. 1B). Moreover, the core region 120 is defined by a region around a central longitudinal axis 155 of the few mode optical fiber 100. The longitudinal axis 155 passes through the center 160 of the optical fiber cable 100.

The refractive index profile determines a relationship between the refractive index of the few mode optical fiber 100 with a radius of the few mode optical fiber 100. Also, the refractive index profile is maintained as per a desired level based on a concentration of chemicals used for the production of the few mode optical fiber 100. In an embodiment of the present disclosure, the production of the few mode optical fiber 100 is carried out after construction of an optical fiber preform.

Moreover, the refractive index profile of the few mode optical fiber 100 is determined during the manufacturing of the few mode optical fiber preform. The refractive index profile is determined based on a concentration of chemicals used during the manufacturing of the few mode optical fiber preform. The chemicals used for the manufacturing of the few mode optical fiber 100 include one or more materials and one or more dopants. Moreover, the one or more materials and the one or more dopants are deposited over a surface of an initial material by performing flame hydrolysis. In an embodiment of the present disclosure, the initial material is a substrate rod or a tube. The deposition is done for achieving a pre-structure of the few mode optical fiber 100.

Further, the few mode optical fiber 100 is manufactured by performing a specific chemical deposition technique of a plurality of chemical deposition techniques. Each of the plurality of chemical deposition techniques performs a chemical vapor deposition over a surface of the initial material by flame hydrolysis or inside the initial material. The plurality of chemical deposition techniques includes a modified chemical vapor deposition technique, an outside vapor deposition technique, an axial vapor deposition technique and the like. Each of the plurality of chemical deposition techniques ensures a specific refractive index required. Also, each of the plurality of chemical deposition techniques manufactures the core region 120 and the cladding region of the few mode optical fiber 100.

In an embodiment of the present disclosure, the radius of the few mode optical fiber 100 is maintained under a pre-defined value set.

In an embodiment of the present disclosure, the Lp01 optical signals in the few mode optical fiber 100 will preferentially propagate in the first annular region 130 which is the central core region of the few mode optical fiber 100. Further, the Lp11 signals in the few mode optical fiber 100 will preferentially propagate in the fifth annular region 150 which is the high index ring region of the few mode optical fiber 100.

In an embodiment of the present disclosure, the cladding region is defined by a different refractive index profile. Moreover, the refractive index profile of the core region 120 and the cladding region is shown through a single graph (as shown in the FIG. 2). Going further, the few mode optical fiber 100 includes the core region 120. The core region 120 has the refractive index profile (as shown in the FIG. 2). In addition, the few mode optical fiber 100 includes a plurality of regions in the core region 120 of the few mode optical fiber 100. In an embodiment of the present disclosure, the core region 120 of the few mode optical fiber 100 is divided into the plurality of regions.

Each of the plurality of regions is defined by a corresponding refractive index and a corresponding radius. In an embodiment of the present disclosure, the refractive index of each of the plurality of regions of the core region 120 is different. In an embodiment of the present disclosure, the radius of each of the plurality of regions of the core region 120 is different.

Further, the refractive index profile of the core region 120 of the few mode optical fiber 100 changes from the center 160 of the optical fiber 100 to the radius of the core. Moreover, the refractive index of each of the plurality of regions of the core region 120 has a pre-defined range of value (mentioned below in detail). In addition, the radius of each of the plurality of regions of the core region 120 has a pre-defined range of value (mentioned below in detail). In an embodiment of the present disclosure, the pre-defined range of value of the refractive index is set to obtain controlled dispersion, minimized spatial overlap and bending losses. In an embodiment of the present disclosure, the spatialoverlap between the Lp01 mode and Lp11 mode is less than 10-5.

In an embodiment of the present disclosure, the pre-defined range of value of the refractive index of each of the plurality of regions is set to maintain the dispersion in pre-defined range or value. Further, the pre-defined range of the value of the core radius is optimized to enable the low bending losses. Furthermore, pre-defined range of the value of the core radius is optimized to enable the minimized spatial overlap between the Lp01 and Lp11 modes. In addition, each region of the plurality of regions has the corresponding refractive index value.

Further, in an embodiment of the present disclosure, the refractive index of each region of the plurality of regions is fixed over a cross-sectional area of each region. Going further, the core region 120 has a first annular region 130, a second annular region 135, a third annular region 140, a fourth annular region 145 and a fifth annular region 150. In an embodiment of the present disclosure, the plurality of regions includes the first annular region 130, the second annular region 135, and the third annular region 140. In addition, the plurality of regions includes the fourth annular region 145 and the fifth annular region 150. Moreover, the first annular region 130, the second annular region 135, the third annular region 140, the fourth annular region 145 and the fifth annular region 150 are concentrically arranged.

Further, the second annular region 135 surrounds the first annular region 130, the third annular region 140 surrounds the second annular region 135 and the fourth annular region 145 surrounds the third annular region 140. Furthermore, the fifth annular region 150 surrounds the fourth annular region 145. The first annular region 130, the second annular region 135, the third annular region 140, the fourth annular region 145 and the fifth annular region 150 is associated with the corresponding refractive index and the corresponding radius. (Mentioned below in detail).

In an embodiment of the present disclosure, the first annular region 130 is the central core region. In an embodiment of the present disclosure, the peak shaping parameter alpha (a) of the central core region is in the range of 2.7 to 10. The expression used for the profile for central core region is as follows:

$$n(r) = n_{max}(1 - 2\Delta(r/r1)^\alpha)^{1/2}$$

wherein, $r \leq r1$;
r: radial position from center; and
a: radial distance; and
α (alpha): the peak shaping parameter.

$$\text{Delta } \%(\Delta\%) = \Delta_{1max}\%/e$$

wherein, e: natural algorithm; and
delta-1 max (Δ1 max): maximum refractive index of the first annular region.

Further, the refractive index of the annular regions 130, 135, 140, 145 and 150 is optimized to get different dispersion, minimized spatial overlap and low bending losses. In an embodiment of the present disclosure, the thickness and refractive index of annular regions 130, 135, 140, 145 and 150 is optimized to minimize the spatial overlap between the Lp011 mode and Lp11 mode.

In an embodiment of the present disclosure, the refractive index and the radius are optimized based on a change in the concentration of a dopant used. In an embodiment of the present disclosure, the dopant includes germanium dioxide, phosphorous pentoxide, aluminium trioxide and the like.

Further, the radius of the first annular region 130, the second annular region 135, the third annular region 140, the fourth annular region 145 and the fifth annular region 150 is optimized for the low bending loss. Furthermore, the radius of all the annular regions including 130, 135, 140, 145 and 150 is optimized for minimized spatial overlap and low differential group delay between the modes.

Going further, the first annular region 130 is between the central longitudinal axis 155 of the few mode optical fiber 100 and a first radius r1 from the central longitudinal axis 155 of the few mode optical fiber 100. The first annular region 130 has a first refractive index delta-1. In addition, the second annular region 135 is between the first radius r1 and a second radius r2 from the central longitudinal axis 155 of the few mode optical fiber 100. The second annular region 135 has a second refractive index delta-2. Further, the third annular region 140 is between the second radius r2 and a third radius r3 from the central longitudinal axis 155 of the few mode optical fiber 100. The third annular region 140 has a third refractive index delta-3. Furthermore, the fourth annular region 145 is between the third radius r3 and a fourth radius r4 from the central longitudinal axis 155 of the few mode optical fiber 100. The fourth annular region 145 has a fourth refractive index delta-4. Furthermore, the fifth annular region 150 is between the fourth radius r4 and a fifth radius r5 from the central longitudinal axis 155 of the few mode optical fiber 100. The fifth annular region 150 has a fifth refractive index delta-5.

The expression used for calculating the refractive index is produced below:

$$\text{delta } \% \ (\Delta\%) = 100 \times \left( \frac{n_i^2 - n_{cl}^2}{2 \times n_i^2} \right)$$

wherein, ncl: the average refractive index of the pure silica;
ni: the refractive index of the layer;
delta %(Δ %): the relative refractive index difference and given in percentage.

The first radius r1 is in the range of 3.8 microns to 4.2 microns. The first refractive index delta-1 is in the range of 0.42 to 0.70. The second radius r2 is in the range of 4.8 microns to 5.2 microns. The second refractive index delta-2 is zero. The third radius r3 is in the range of 8.2 microns to 8.7 microns. The third refractive index delta-3 is in the range of 0.4 to 0.58. The fourth radius r4 is in the range of 8.3 microns to 9.9 microns. The fourth refractive index delta-4 is zero. The fifth radius r5 is in the range of 10.9 microns to 12.6 microns. The fifth refractive index delta-5 is in the range of 0.41 to 0.62.

The first annular region 130 is the central core region, the second annular region 135 is the buffer region and the third annular region 140 is the trench region. The trench region is a downdopant region in the optical fiber 100. Downdopant is a type of dopant which has the tendency to decrease the refractive index of glass with respect to pure. In addition, the fourth annular region 145 is the buffer region and the fifth annular region 150 is the high index ring region. The central core region and the high Index Ring region is an updopant region in the optical fiber cable 100. Updopant is a type of dopant which has the tendency to increase the refractive index of glass with respect to pure. The buffer region is undopant region and consist pure silica.

Further, the few mode optical fiber 100 includes a cladding. The cladding surrounds the core region 120. In addition, the cladding is concentrically arranged around the core region 120. Moreover, the cladding covers the core region 120. Further, the cladding is defined by a specific refractive index and a specific radius. In an embodiment of the present disclosure, the refractive index and the radius of the cladding is optimized for achieving the pre-defined value of the dispersion. The cladding is a sixth annular region 125 of the optical fiber 100. The sixth annular region 125 is between the fifth radius r5 and the sixth radius r6. The sixth annular region 125 concentrically surrounds the fifth annular region 150. The sixth radius r6 is 62.5 microns. The sixth refractive index delta-6 is zero.

In an embodiment of the present disclosure, the value of the sixth refractive index delta-6 is constant throughout a cross-sectional area of the sixth annular region 125 (as shown in the FIG. 2). In an embodiment of the present disclosure, the sixth radius r6 of the sixth annular region 140 is fixed. Further, the value of the sixth refractive index delta-6 and the sixth radius r6 is optimized for achieving the pre-defined value of the dispersion, the intermodal crosstalk and the bending losses.

FIG. 2 illustrates a refractive index profile 200 of the few mode optical fiber 100, in accordance with various embodiments of the present disclosure. It may be noted that to explain a graphical appearance of the refractive index profile 200, references will be made to the structural elements of the few mode optical fiber 100. The refractive index profile 200 illustrates a relationship between the refractive index of the few mode optical fiber 100 and the radius of the few mode optical fiber 100 (as stated above in the detailed description of the FIG. 1A). In an embodiment of the present disclosure, the refractive index profile 200 shows the change in the refractive index of the few mode optical fiber 100 with the radius of the few mode optical fiber 100.

Further, in an embodiment of the present disclosure, the first annular region 130 has high index region. The first annular region 130 is the central core region. The second annular region 135 is the buffer region. The third annular region 140 is the trench region. The fourth annular region 145 is the buffer region. The fifth annular region 150 is the high index ring region. The sixth annular region 125 is the cladding region. The first radius r1 is in the range of 3.8 microns to 4.2 microns. The first refractive index delta-1 is in the range of 0.42 to 0.70. The second radius r2 is in the range of 4.8 microns to 5.2 microns. The second refractive index delta-2 is zero. The third radius r3 is in the range of 8.2 microns to 8.7 microns. The third refractive index delta-3 is in the range of 0.4 to 0.58. The fourth radius r4 is in the range of 8.3 microns to 9.9 microns. The fourth refractive index delta-4 is zero. The fifth radius r5 is in the range of 10.9 microns to 12.6 microns. The fifth refractive index delta-5 is in the range of 0.41 to 0.62. The sixth radius r6 is 62.5 microns. The sixth refractive index delta-6 is zero. The peak shaping parameter alpha (a) of the central core region is in the range of 2.7 to 10.

In an embodiment of the present disclosure, the few mode optical fiber 100 is operated in the wavelength range of 1460 nm to 1625 nm in Lp01 mode and Lp11 mode. In addition, the few mode optical fiber is operated in six modes. The six modes include two degenerate Lp01 modes and four degenerate Lp11 modes.

FIG. 3 illustrates an intensity-radial distance profile 300 for Lp01 mode and Lp11 mode, in accordance with an embodiment of the present disclosure. The spatial overlap between the intensity profiles of Lp01 mode and Lp11 mode is less than 10-5. The marching line in the curve represents the Lp11 mode whereas the dark line in the curve represents the Lp01 mode.

The various embodiments of the present disclosure for the optimization of radius, refractive index, dispersion, macrobending losses, mode field diameter, spatial overlap, effective area, differential group delay and theoretical cut-off wavelength is described below. Note that the definitions of all the terms and parameters used to explain the below mentioned embodiments are already explained in detail above.

In an embodiment of the present disclosure, the radius r1 of the first annular region 130 is 4.15 microns. The refractive index delta-1 of the first annular region 130 is 0.54. The alpha (a) of the first annular region 130 which is the central core region is 2.7. The radius r2 of the second annular region 135 is 5.15 microns. The refractive index delta-2 of the second annular region 135 is zero. The radius r3 of the third annular region 140 is 8.65 microns. The refractive index delta-3 of the third annular region 140 is 0.41. The radius r4 of the fourth annular region 145 is 8.85 microns. The refractive index delta-4 of the fourth annular region 145 is zero. The radius r5 of the fifth annular region 150 is 11.75 microns. The refractive index delta-5 of the fifth annular region 150 is 0.6. The radius r6 of the sixth annular region 125 is 62.5 microns. The refractive index delta-6 of the sixth annular region 125 is zero. The dispersion is 4.94 Ps/nm/km for Lp01 mode at a wavelength of 1460 nm. The dispersion is 1.67 Ps/nm/km for Lp11 mode at a wavelength of 1460 nm. The dispersion is 4.95 Ps/nm/km for Lp01 mode at a wavelength of 1530 nm. The dispersion is 6.6 Ps/nm/km for Lp11 mode at a wavelength of 1530 nm. The dispersion is 4.78 Ps/nm/km for Lp01 mode at a wavelength of 1550 nm. The dispersion is 7.96 Ps/nm/km at Lp11 mode at a wavelength of 1550 nm. The dispersion is 4.55 Ps/nm/km for Lp01 mode at a wavelength of 1565 nm. The dispersion is 8.96 Ps·nm/km for Lp11 mode at a wavelength of 1565 nm. The dispersion is 3.95 Ps/nm/km for Lp01 mode at a wavelength of 1625 nm. The dispersion is 12.64 Ps/nm/km for Lp11 mode at a wavelength of 1625 nm. The mode field diameter of the optical fiber 100 for Lp01 mode is 8.2 μm at a wavelength of 1550 nm. The spatial overlap between Lp01 mode and Lp11 mode in the optical fiber 100 is less than 10-5. The macrobend loss for Lp11 mode in the optical fiber 100 is 1.492 dB/turn for 16 mm bending radius at a wavelength of 1625 nm. The effective area of the optical fiber 100 is 55 μm2 for Lp01 mode at a wavelength of 1550 nm. The effective area of the optical fiber 100 is 390 μm2 for Lp11 mode at a wavelength of 1550 nm. The theoretical cut-off wavelength for Lp11 mode is 2797 nm. The theoretical cut-off wavelength for Lp02 mode is 2165 nm. The differential group delay between Lp01 mode and Lp11 mode at a wavelength of 1550 nm is 0.004 ps/km.

In another embodiment of the present disclosure, the radius r1 of the first annular region 130 is 4.15 microns. The refractive index delta-1 of the first annular region 130 is 0.56. The alpha (a) of the first annular region 130 which is the central core region is 8. The radius r2 of the second annular region 135 is 5.15 microns. The refractive index delta-2 of the second annular region 135 is zero. The radius r3 of the third annular region 140 is 8.65 microns. The refractive index delta-3 of the third annular region 140 is 0.40. The radius r4 of the fourth annular region 145 is 8.85 microns. The refractive index delta-4 of the fourth annular region 145 is zero. The radius r5 of the fifth annular region 150 is 11.75 microns. The refractive index delta-5 of the fifth annular region 150 is 0.59. The radius r6 of the sixth annular region 125 is 62.5 microns. The refractive index delta-6 of the sixth annular region 125 is zero. The dispersion is 13.7 Ps/nm/km for Lp01 mode at a wavelength of 1460 nm. The dispersion is 1.62 Ps/nm/km for Lp11 mode at a wavelength of 1460 nm. The dispersion is 17.48 Ps/nm/km for Lp01 mode at a wavelength of 1530 nm. The dispersion is 6.58 Ps/nm/km for Lp11 mode at a wavelength of 1530 nm. The dispersion is 18.42 Ps/nm/km for Lp01 mode at a wavelength of 1550 nm. The dispersion is 7.98 Ps/nm/km at Lp11 mode at a wavelength of 1550 nm. The dispersion is 19.09 Ps/nm/km for Lp01 mode at a wavelength of 1565 nm. The dispersion is 8.98 Ps·nm/km for Lp11 mode at a wavelength of 1565 nm. The dispersion is 21.31 Ps/nm/km for Lp01 mode at a wavelength of 1625 nm. The dispersion is 12.95 Ps/nm/km for Lp11 mode at a wavelength of 1625 nm. The mode field diameter of the optical fiber 100 for Lp01 mode is 7.8 µm at a wavelength of 1550 nm. The spatial overlap between Lp01 mode and Lp11 mode in the optical fiber 100 is less than 10-5. The macrobend loss for Lp11 mode in the optical fiber 100 is 1.49 dB/turn for 16 mm bending radius at a wavelength of 1625 nm. The effective area of the optical fiber 100 is 49 µm2 for Lp01 mode at a wavelength of 1550 nm. The effective area of the optical fiber 100 is 392 µm2 for Lp11 mode at a wavelength of 1550 nm. The theoretical cut-off wavelength for Lp11 mode is 2738 nm. The theoretical cut-off wavelength for Lp02 mode is 2380 nm. The differential group delay between Lp01 mode and Lp11 mode at a wavelength of 1550 nm is 0.010 ps/km.

In yet another embodiment of the present disclosure, the radius r1 of the first annular region 130 is 4.10 microns. The refractive index delta-1 of the first annular region 130 is 0.49. The alpha (a) of the first annular region 130 which is the central core region is 10. The radius r2 of the second annular region 135 is 4.9 microns. The refractive index delta-2 of the second annular region 135 is zero. The radius r3 of the third annular region 140 is 8.3 microns. The refractive index delta-3 of the third annular region 140 is 0.52. The radius r4 of the fourth annular region 145 is 8.3 microns. The refractive index delta-4 of the fourth annular region 145 is zero. The radius r5 of the fifth annular region 150 is 10.9 microns. The refractive index delta-5 of the fifth annular region 150 is 0.62. The radius r6 of the sixth annular region 125 is 62.5 microns. The refractive index delta-6 of the sixth annular region 125 is zero. The dispersion is 12.69 Ps/nm/km for Lp01 mode at a wavelength of 1460 nm. The dispersion is 0.37 Ps/nm/km for Lp11 mode at a wavelength of 1460 nm. The dispersion is 15.35 Ps/nm/km for Lp01 mode at a wavelength of 1530 nm. The dispersion is 4.57 Ps/nm/km for Lp11 mode at a wavelength of 1530 nm. The dispersion is 16.1 Ps/nm/km for Lp01 mode at a wavelength of 1550 nm. The dispersion is 5.85 Ps/nm/km at Lp11 mode at a wavelength of 1550 nm. The dispersion is 16.3 Ps/nm/km for Lp01 mode at a wavelength of 1565 nm. The dispersion is 6.84 Ps·nm/km for Lp11 mode at a wavelength of 1565 nm. The dispersion is 18.1 Ps/nm/km for Lp01 mode at a wavelength of 1625 nm. The dispersion is 10.75 Ps/nm/km for Lp11 mode at a wavelength of 1625 nm. The mode field diameter of the optical fiber 100 for Lp01 mode is 8 µm at a wavelength of 1550 nm. The spatial overlap between Lp01 mode and Lp11 mode in the optical fiber 100 is less than 10-5. The macrobend loss for Lp11 mode in the optical fiber 100 is 1.47 dB/turn for 16 mm bending radius at a wavelength of 1625 nm. The effective area of the optical fiber 100 is 53 µm2 for Lp01 mode at a wavelength of 1550 nm. The effective area of the optical fiber 100 is 368 µm2 for Lp11 mode at a wavelength of 1550 nm. The theoretical cut-off wavelength for Lp11 mode is 2645 nm. The theoretical cut-off wavelength for Lp02 mode is 2241 nm. The differential group delay between Lp01 mode and Lp11 mode at a wavelength of 1550 nm is 0.005 ps/km.

In an embodiment of the present disclosure, the radius r1 of the first annular region 130 is 3.8 microns. The refractive index delta-1 of the first annular region 130 is 0.70. The alpha (a) of the first annular region 130 which is the central core region is 10. The radius r2 of the second annular region 135 is 4.8 microns. The refractive index delta-2 of the second annular region 135 is zero. The radius r3 of the third annular region 140 is 8.4 microns. The refractive index delta-3 of the third annular region 140 is 0.54. The radius r4 of the fourth annular region 145 is 9.9 microns. The refractive index delta-4 of the fourth annular region 145 is zero. The radius r5 of the fifth annular region 150 is 12.6 microns. The refractive index delta-5 of the fifth annular region 150 is 0.62. The radius r6 of the sixth annular region 125 is 62.5 microns. The refractive index delta-6 of the sixth annular region 125 is zero. The dispersion is 15.98 Ps/nm/km for Lp01 mode at a wavelength of 1460 nm. The dispersion is 3.64 Ps/nm/km for Lp11 mode at a wavelength of 1460 nm. The dispersion is 20.39 Ps/nm/km for Lp01 mode at a wavelength of 1530 nm. The dispersion is 8.63 Ps/nm/km for Lp11 mode at a wavelength of 1530 nm. The dispersion is 21.62 Ps/nm/km for Lp01 mode at a wavelength of 1550 nm. The dispersion is 10.01 Ps/nm/km at Lp11 mode at a wavelength of 1550 nm. The dispersion is 22.49 Ps/nm/km for Lp01 mode at a wavelength of 1565 nm. The dispersion is 11.03 Ps·nm/km for Lp11 mode at a wavelength of 1565 nm. The dispersion is 25.51 Ps/nm/km for Lp01 mode at a wavelength of 1625 nm. The dispersion is 14.75 Ps/nm/km for Lp11 mode at a wavelength of 1625 nm. The mode field diameter of the optical fiber 100 for Lp01 mode is 7.4 µm at a wavelength of 1550 nm. The spatial overlap between Lp01 mode and Lp11 mode in the optical fiber 100 is less than 10-5. The macrobend loss for Lp11 mode in the optical fiber 100 is 1.3 dB/turn for 16 mm bending radius at a wavelength of 1625 nm. The effective area of the optical fiber 100 is 43 µm2 for Lp01 mode at a wavelength of 1550 nm. The effective area of the optical fiber 100 is 425 µm2 for Lp11 mode at a wavelength of 1550 nm. The theoretical cut-off wavelength for Lp11 mode is 2810 nm. The theoretical cut-off wavelength for Lp02 mode is 2500 nm. The differential group delay between Lp01 mode and Lp11 mode at a wavelength of 1550 nm is 0.020 ps/km.

In an embodiment of the present disclosure, the radius r1 of the first annular region 130 is 3.8 microns. The refractive index delta-1 of the first annular region 130 is 0.42. The alpha (a) of the first annular region 130 which is the central core region is 10. The radius r2 of the second annular region 135 is 5 microns. The refractive index delta-2 of the second annular region 135 is zero. The radius r3 of the third annular region 140 is 8.2 microns. The refractive index delta-3 of the third annular region 140 is 0.58. The radius r4 of the fourth annular region 145 is 9.7 microns. The refractive index delta-4 of the fourth annular region 145 is zero. The radius r5 of the fifth annular region 150 is 12.3 microns. The refractive index delta-5 of the fifth annular region 150 is 0.41. The radius r6 of the sixth annular region 125 is 62.5 microns. The refractive index delta-6 of the sixth annular region 125 is zero. The dispersion is 12.3 Ps/nm/km for Lp01 mode at a wavelength of 1460 nm. The dispersion is 5.64 Ps/nm/km for Lp11 mode at a wavelength of 1460 nm. The dispersion is 13.9 Ps/nm/km for Lp01 mode at a wavelength of 1530 nm. The dispersion is 10.4 Ps/nm/km for Lp11 mode at a wavelength of 1530 nm. The dispersion is 13.84 Ps/nm/km for Lp01 mode at a wavelength of 1550 nm. The dispersion is 11.77 Ps/nm/km at Lp11 mode at a wavelength of 1550 nm. The dispersion is 13.6 Ps/nm/km for Lp01 mode at a wavelength of 1565 nm. The dispersion is 12.69 Ps·nm/km for Lp11 mode at a wavelength of 1565 nm. The dispersion is 10.86 Ps/nm/km for Lp01 mode at a wavelength of 1625 nm. The dispersion is 16.25 Ps/nm/km for Lp11 mode at a wavelength of 1625 nm. The mode field diameter of the optical fiber 100 for Lp01 mode is 8 μm at a wavelength of 1550 nm. The spatial overlap between Lp01 mode and Lp11 mode in the optical fiber 100 is less than 10-5. The macrobend loss for Lp11 mode in the optical fiber 100 is 2.1 dB/turn for 16 mm bending radius at a wavelength of 1625 nm. The effective area of the optical fiber 100 is 51 μm2 for Lp01 mode at a wavelength of 1550 nm. The effective area of the optical fiber 100 is 570 μm2 for Lp11 mode at a wavelength of 1550 nm. The theoretical cut-off wavelength for Lp11 mode is 2281 nm. The theoretical cut-off wavelength for Lp02 mode is 1950 nm. The differential group delay between Lp01 mode and Lp111 mode at a wavelength of 1550 nm is 0.012 ps/km.

Going further, the present disclosure provides numerous advantages over the prior art. The present disclosure provides the few mode optical fiber with controlled dispersion, minimized spatial overlap and low bending losses. In addition, the present disclosure, the few mode optical fiber is operated in Lp01 mode and Lp11 mode. In addition, the few mode optical fiber is operated in six modes including two degenerate Lp01 modes and four Lp11 modes. Further, the present disclosure provides spatial overlap less than 10-5 between Lp01 mode and Lp11 mode throughout the range of wavelength between 1460 nm to 1625 nm.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A few mode optical fiber comprising:
   a core region defined by a region around a central longitudinal axis of the few mode optical fiber, the core region comprising:
     a first annular region, wherein the first annular region is between the central longitudinal axis and a first radius $r_1$, wherein the first annular region has a first refractive index delta-1;
     a second annular region, wherein the second annular region is between the first radius $r_1$ and a second radius $r_2$, wherein the second annular region has a second refractive index delta-2;
     a third annular region, wherein the third annular region is between the second radius $r_2$ and a third radius $r_3$, wherein the third annular region has a third refractive index delta-3;
     a fourth annular region, wherein the fourth annular region is between the third radius $r_3$ and a fourth radius $r_4$, wherein the fourth annular region has a fourth refractive index $\Delta_4$, wherein the fourth radius $r_4$ is in a range of 8.3 microns to 9.9 microns and the fourth refractive index delta-4 is approximately zero;
     a fifth annular region, wherein the fifth annular region is between the fourth radius $r_4$ and a fifth radius $r_5$, wherein the fifth region has a fifth refractive index delta-5, wherein the fifth radius $r_5$ is in a range of 10.9 microns to 12.6 microns and the fifth refractive index delta-5 is in a range of 0.41 to 0.62; and
   a cladding region, wherein the cladding region is a sixth annular region between the fifth radius $r_5$ and a sixth radius $r_6$, wherein the sixth annular region has a sixth refractive index delta-6, wherein the sixth radius $r_6$ is 62.5 microns and the sixth refractive index delta-6 is approximately zero, wherein the first annular region, the second annular region, the third region, the fourth region, the fifth region and the sixth annular region are concentrically arranged about the central longitudinal axis, and
   wherein the few mode optical fiber has a spatial overlap between the Lp01 mode and Lp11 mode of less than $10^{-5}$.

2. The few mode optical fiber as claimed in claim 1, wherein the first radius $r_1$ is in a range of 3.8 microns to 4.2 microns and the first refractive index delta-1 is in a range of 0.42 to 0.70, wherein the second radius $r_2$ is in a range of 4.8 microns to 5.2 microns and the second refractive index delta-2 is approximately zero and wherein the third radius $r_3$ is in a range of 8.2 microns to 8.7 microns and the third refractive index delta-3 is in a range of 0.4 to 0.58.

3. The few mode optical fiber as claimed in claim 1, wherein the first annular region has an alpha profile, wherein the alpha profile is defined by a peak shaping parameter alpha, wherein the peak shaping parameter alpha is in a range of 2.7 to 10.

4. The few mode optical fiber as claimed in claim 1, wherein the few mode optical fiber has a mode field diameter in a range of 7.4 μm to 8.2 μm for Lp01 mode at a wavelength of 1550 nm, wherein the few mode optical fiber has an effective area in a range of 43 μm² to 55 μm² for Lp01 mode at a wavelength of 1550 nm and wherein the few mode optical fiber has a effective area in a range of 368 μm² to 570 μm² for Lp11 mode at a wavelength of 1550 nm, and wherein the few mode optical fiber has a theoretical cutoff wavelength in a range of 2281 nm to 2810 nm for Lp11 mode and wherein the few mode optical fiber has a theoretical cutoff wavelength in a range of 1950 nm to 2500 nm for Lp02 mode.

5. The few mode optical fiber as claimed in claim 1, wherein the few mode optical fiber has a differential group delay between Lp01 mode and Lp11 mode of less than 0.2 ps/km at a wavelength of 1550 nm.

6. The few mode optical fiber as claimed in claim 1, wherein the few mode optical fiber has a dispersion in a range of 4 Ps/nm/km to 16 Ps/nm/km for Lp01 mode at a wavelength of 1460 nm, wherein the few mode optical fiber has a dispersion in a range of −0.3 ps/nm/km to 6 Ps/nm/km for Lp11 mode at a wavelength of 1460 nm, wherein the few mode optical fiber has a dispersion in a range of 4.1 Ps/nm/km to 21 Ps/nm/km for Lp01 mode at a wavelength of 1530 nm, wherein the few mode optical fiber has a dispersion in a range of 4.5 Ps/nm/km to 11 Ps/nm/km for Lp1111 mode at a wavelength of 1530 nm, wherein the few mode optical fiber has a dispersion in a range of 4 Ps/nm/km to 22 Ps/nm/km for Lp01 mode at a wavelength of 1550 nm, wherein the few mode optical fiber has a dispersion in a range of 5.8 Ps/nm/km to 12 Ps/nm/km for Lp11 mode at a wavelength of 1550 nm, wherein the few mode optical fiber has a dispersion in a range of 4.5 Ps/nm/km to 23 Ps/nm/km for Lp01 mode at a wavelength of 1565 nm, wherein the few mode optical fiber has a dispersion in a range of 6.8 Ps/nm/km to 13 Ps/nm/km for Lp11 mode at a wavelength of 1565 nm, wherein the few mode optical fiber has a dispersion in a range of 3.9 Ps/nm/km to 26 Ps/nm/km for Lp01 mode at a wavelength of 1625 nm and wherein the few mode optical fiber has a dispersion in a range of 10 Ps/nm/km to 17 Ps/nm/km for Lp11 mode at a wavelength of 1625 nm.

7. The few mode optical fiber as claimed in claim 1, wherein the few mode optical fiber has a macrobending loss of less than 2.1 dB/turn for 16 mm bending radius at a wavelength of 1625 nm for Lp11 mode.

8. A few mode optical fiber comprising:
a core region defined by a region around a central longitudinal axis of the few mode optical fiber, the core region comprising:
a plurality of annular regions, wherein the plurality of annular regions comprising:
a first annular region, wherein the first annular region is between the central longitudinal axis and a first radius $r_1$, wherein the first annular region has a first refractive index delta-1;
a second annular region, wherein the second annular region is between the first radius $r_1$ and a second radius $r_2$, wherein the second annular region has a second refractive index delta-2;
a third annular region, wherein the third annular region is between the second radius $r_2$ and a third radius $r_3$, wherein the third annular region has a third refractive index delta-3;
a fourth annular region, wherein the fourth annular region is between a third radius $r_3$ and a fourth radius $r_4$, wherein the fourth annular region has a fourth refractive index $\Delta_4$, wherein the fourth radius $r_4$ is in a range of 8.3 microns to 9.9 microns and the fourth refractive index delta-4 is approximately zero;
a fifth annular region, wherein the fifth annular region is between the fourth radius $r_4$ and a fifth radius $r_5$, wherein the fifth region has a fifth refractive index delta-5, wherein the fifth radius $r_5$ is in a range of 10.9 microns to 12.6 microns and the fifth refractive index delta-5 is in a range of 0.41 to 0.62; and
a cladding region, wherein the cladding region is a sixth annular region between the fifth radius $r_5$ and a sixth radius $r_6$, wherein the sixth annular region has a sixth refractive index delta-6, wherein the first annular region, the second annular region, the third annular region, the fourth annular region, the fifth annular region and the sixth annular region are concentrically arranged about the central longitudinal axis,
wherein the few mode optical fiber has a spatial overlap between the Lp01 mode and Lp11 mode of less than $10^{-5}$.

9. The few mode optical fiber as claimed in claim 8, wherein a first radius $r_1$ is in a range of 3.8 microns to 4.2 microns and a first refractive index delta-1 is in a range of 0.42 to 0.70, wherein a second radius $r_2$ is in a range of 4.8 microns to 5.2 microns and a second refractive index delta-2 is approximately zero and wherein a third radius $r_3$ is in a range of 8.2 microns to 8.7 microns and a third refractive index delta-3 is in a range of 0.4 to 0.58.

10. The few mode optical fiber as claimed in claim 8, wherein the sixth radius $r_6$ is 62.5 microns and the sixth refractive index delta-6 is approximately zero.

11. The few mode optical fiber as claimed in claim 8, wherein a first annular region has an alpha profile, wherein the alpha profile is defined by a peak shaping parameter alpha, wherein the peak shaping parameter alpha is in a range of 2.7 to 10.

12. The few mode optical fiber as claimed in claim 8, wherein the few mode optical fiber has a mode field diameter in a range of 7.4 μm to 8.2 μm for Lp01 mode at a wavelength of 1550 nm, wherein the few mode optical fiber has an effective area in a range of 43 μm² to 55 μm² for Lp01 mode at a wavelength of 1550 nm, wherein the few mode optical fiber has a effective area in a range of 368 μm² to 570 μm² for Lp11 mode at a wavelength of 1550 nm, wherein the few mode optical fiber has a theoretical cutoff wavelength in a range of 2281 nm to 2810 nm for Lp11 mode and wherein the few mode optical fiber has a theoretical cutoff wavelength in a range of 1950 nm to 2500 nm for Lp02 mode.

13. The few mode optical fiber as claimed in claim 8, wherein the few mode optical fiber has a differential group delay between Lp01 mode and Lp11 mode of less than 0.2 ps/km at a wavelength of 1550 nm.

14. The few mode optical fiber as claimed in claim 8, wherein the few mode optical fiber has a dispersion in a range of 4 Ps/nm/km to 16 Ps/nm/km for Lp01 mode at a wavelength of 1460 nm, wherein the few mode optical fiber has a dispersion in a range of −0.3 ps/nm/km to 6 Ps/nm/km for Lp11 mode at a wavelength of 1460 nm, wherein the few mode optical fiber has a dispersion in a range of 4.1 Ps/nm/km to 21 Ps/nm/km for Lp01 mode at a wavelength of 1530 nm, wherein the few mode optical fiber has a dispersion in a range of 4.5 Ps/nm/km to 11 Ps/nm/km for Lp11 mode at a wavelength of 1530 nm, wherein the few mode optical fiber has a dispersion in a range of 4 Ps/nm/km to 22 Ps/nm/km for Lp01 mode at a wavelength of 1550 nm, wherein the few mode optical fiber has a dispersion in a range of 5.8 Ps/nm/km to 12 Ps/nm/km for Lp11 mode at a wavelength of 1550 nm, wherein the few mode optical fiber has a dispersion in a range of 4.5 Ps/nm/km to 23 Ps/nm/km for Lp01 mode at a wavelength of 1565 nm, wherein the few mode optical fiber has a dispersion in a range of 6.8 Ps/nm/km to 13 Ps/nm/km for Lp11 mode at a wavelength of 1565 nm, wherein the few mode optical fiber has a dispersion in a range of 3.9 Ps/nm/km to 26 Ps/nm/km for Lp01 mode at a wavelength of 1625 nm and wherein the few mode optical fiber has a dispersion in a range of 10 Ps/nm/km to 17 Ps/nm/km for Lp11 mode at a wavelength of 1625 nm.

15. A few mode optical fiber comprising:
a core region defined by a region around a central longitudinal axis of the few mode optical fiber, the core region comprising:
a first annular region, wherein the first annular region is between the central longitudinal axis and a first radius $r_1$, wherein the first annular region has a first refractive index delta-1, wherein the first radius $r_1$ is in a range of 3.8 microns to 4.2 microns and the first refractive index delta-1 is in a range of 0.42 to 0.70;
a second annular region, wherein the second annular region is between the first radius $r_1$ and a second radius $r_2$, wherein the second annular region has a second refractive index delta-2, wherein the second radius $r_2$ is in a range of 4.8 microns to 5.2 microns and the second refractive index delta-2 is approximately zero;
a third annular region, wherein the third annular region is between the second radius $r_2$ and a third radius $r_3$, wherein the third annular region has a third refractive index delta-3, wherein the third radius $r_3$ is in a range of 8.2 microns to 8.7 microns and the third refractive index delta-3 is in a range of 0.4 to 0.58;
a fourth annular region, wherein the fourth annular region is between the third radius $r_3$ and a fourth radius $r_4$, wherein the fourth annular region has a fourth refractive index $\Delta_4$, wherein the fourth radius $r_4$ is in a range of 8.3 microns to 9.9 microns and the fourth refractive index delta-4 is approximately zero;
a fifth annular region, wherein the fifth annular region is between the fourth radius $r_4$ and a fifth radius $r_5$, wherein the fifth region has a fifth refractive index delta-5, wherein the fifth radius $r_5$ is in a range of 10.9 microns to 12.6 microns and the fifth refractive index delta-5 is in a range of 0.41 to 0.62; and
a cladding region, wherein the cladding region is a sixth annular region between the fifth radius $r_5$ and a sixth radius $r_6$, wherein the sixth annular region has a sixth refractive index delta-6, wherein the sixth radius $r_6$ is 62.5 microns and the sixth refractive index delta-6 is approximately zero, wherein the first annular region, the second annular region, the third region, the fourth region, the fifth region and the sixth annular region are concentrically arranged about the central longitudinal axis, and wherein the few mode optical fiber has a spatial overlap between the Lp01 mode and Lp111 mode of less than $10^{-5}$, and wherein the first annular region has an alpha profile, wherein the alpha profile is defined by a peak shaping parameter alpha, wherein the peak shaping parameter alpha is in a range of 2.7 to 10.

16. The few mode optical fiber as claimed in claim 15, wherein the few mode optical fiber has a mode field diameter in a range of 7.4 µm to 8.2 µm for Lp01 mode at a wavelength of 1550 nm, wherein the few mode optical fiber has an effective area in a range of 43 µm² to 55 µm² for Lp01 mode at a wavelength of 1550 nm and wherein the few mode optical fiber has a effective area in a range of 368 µm² to 570 µm² for Lp11 mode at a wavelength of 1550 nm, and wherein the few mode optical fiber has a theoretical cutoff wavelength in a range of 2281 nm to 2810 nm for Lp11 mode and wherein the few mode optical fiber has a theoretical cutoff wavelength in a range of 1950 nm to 2500 nm for Lp02 mode.

17. The few mode optical fiber as claimed in claim 15, wherein the few mode optical fiber has a differential group delay between Lp01 mode and Lp111 mode of less than 0.2 ps/km at a wavelength of 1550 nm.

18. The few mode optical fiber as claimed in claim 15, wherein the few mode optical fiber has a dispersion in a range of 4 Ps/nm/km to 16 Ps/nm/km for Lp01 mode at a wavelength of 1460 nm, wherein the few mode optical fiber has a dispersion in a range of −0.3 ps/nm/km to 6 Ps/nm/km for Lp11 mode at a wavelength of 1460 nm, wherein the few mode optical fiber has a dispersion in a range of 4.1 Ps/nm/km to 21 Ps/nm/km for Lp01 mode at a wavelength of 1530 nm, wherein the few mode optical fiber has a dispersion in a range of 4.5 Ps/nm/km to 11 Ps/nm/km for Lp1111 mode at a wavelength of 1530 nm, wherein the few mode optical fiber has a dispersion in a range of 4 Ps/nm/km to 22 Ps/nm/km for Lp01 mode at a wavelength of 1550 nm, wherein the few mode optical fiber has a dispersion in a range of 5.8 Ps/nm/km to 12 Ps/nm/km for Lp11 mode at a wavelength of 1550 nm, wherein the few mode optical fiber has a dispersion in a range of 4.5 Ps/nm/km to 23 Ps/nm/km for Lp01 mode at a wavelength of 1565 nm, wherein the few mode optical fiber has a dispersion in a range of 6.8 Ps/nm/km to 13 Ps/nm/km for Lp11 mode at a wavelength of 1565 nm, wherein the few mode optical fiber has a dispersion in a range of 3.9 Ps/nm/km to 26 Ps/nm/km for Lp01 mode at a wavelength of 1625 nm and wherein the few mode optical fiber has a dispersion in a range of 10 Ps/nm/km to 17 Ps/nm/km for Lp11 mode at a wavelength of 1625 nm.

19. The few mode optical fiber as claimed in claim 15, wherein the few mode optical fiber has a macrobending loss of less than 2.1 dB/turn for 16 mm bending radius at a wavelength of 1625 nm for Lp11 mode.

* * * * *